Oct. 14, 1947. H. P. SERIO 2,428,894
COVER FOR FRYING PANS AND THE LIKE
Filed Oct. 4, 1944
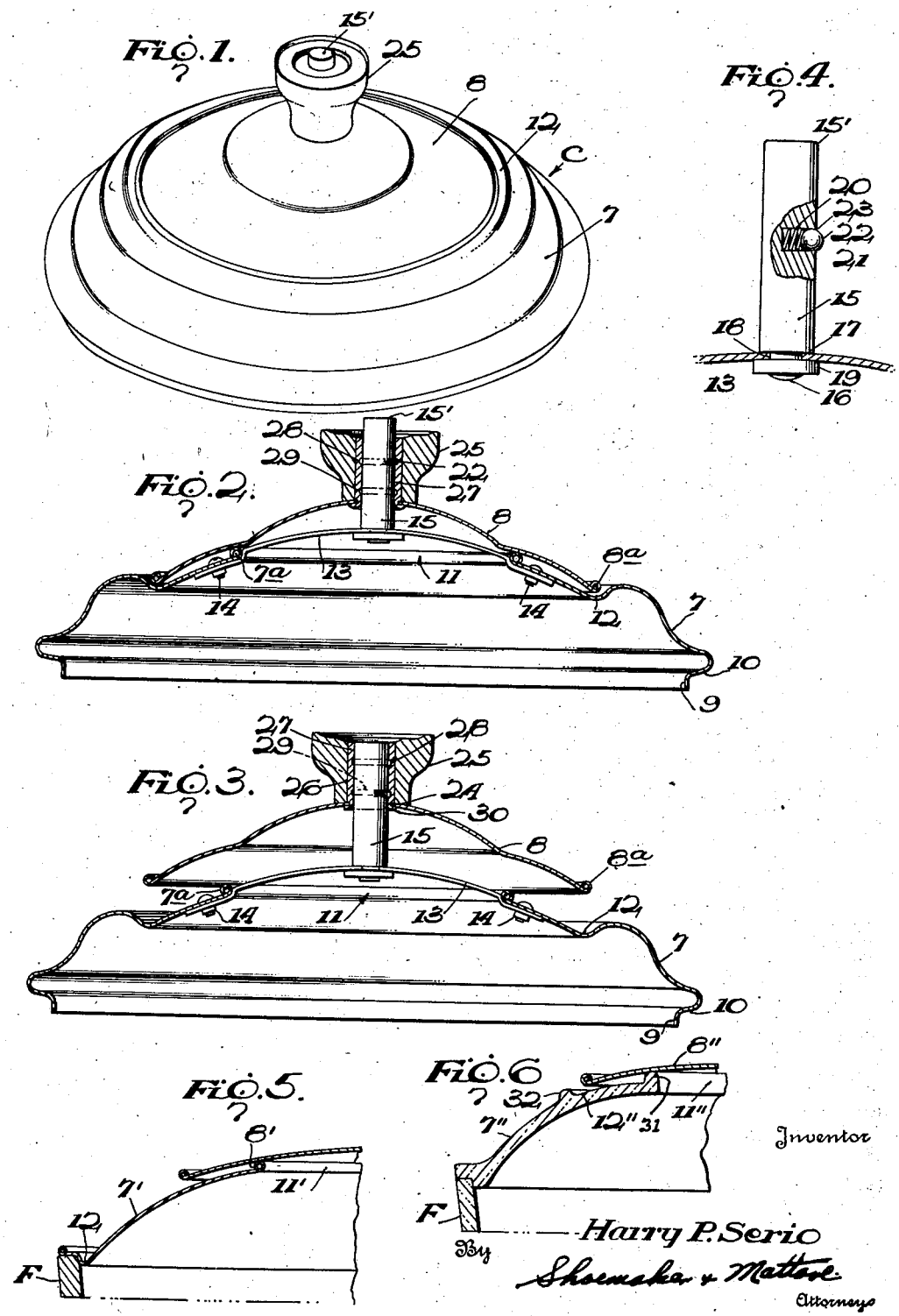
Inventor
Harry P. Serio
By Shoemaker & Mattese
Attorneys Patented Oct. 14, 1947

2,428,894

UNITED STATES PATENT OFFICE 2,428,894

COVER FOR FRYING PANS AND THE LIKE

Harry P. Serio, Elmira, N. Y.

Application October 4, 1944, Serial No. 557,202

2 Claims. (Cl. 220—44)

This invention relates to a cover for frying pans and the like.

The cover or lid constituting the present invention is particularly adapted for use in combination wtih frying pans, but can also be used in connection with other types of cooking and frying utensils.

It is well known that in frying certain foods where a lid or cover is not placed on the frying pan, the grease spatters from the pan onto the stove or range, and with the modern ranges, the grease spatters on the walls of the kitchen. When using an ordinary cover, the top of the frying pan is completely closed and this is not desirable during certain frying or cooking operations, and with this type of lid or cover, when the same is removed, the spattering results, and this is undesirable.

The lid or cover constituting the present invention is constructed so that it can be used in a conventional manner as lids or covers have heretofore been used. However, this present lid or cover for frying pans and the like is particularly adapted to be manipulated so that an opening exists between the main cover or lid and another smaller or auxiliary cover which is attached to the main cover or lid. The creation of this opening is by a simple mechanical movement, and when the opening is created between the two covers, the spattering of the grease will be collected in a portion of one of the covers, thereby being prevented from splashing or spattering on the range or on the walls of the kitchen.

The cover or lid embodied in this invention is ideally suited for frying purposes in that the lid or cover can be open during a certain portion of the frying operation, and then after the food has been well browned, the outer surface of the same becomes hard, and by simply closing the cover, the steam and vapors formed within the closed frying pan can be utilized to effect a tenderizing of the browned food surface. All of this can be accomplished without removing the cover from the frying pan or other cooking utensil.

Then too, the present cover or lid for frying pans and the like is so designed that the opening and closing thereof can be readily effected by the use of one hand only and not requiring the lid to be held on the frying receptacle by means of the other hand or a fork or the like. This too is an important feature, because these lids or covers become hot during the frying operation and in the prior art devices it is necessary to employ both hands to effect the opening of the lid, and this had to be done by raising a portion of the lid with one hand and holding the main portion of the lid down with a kitchen article, say, for instance, a knife or fork.

One object of my invention is to provide a lid or cover for frying pans and similar cooking utensils whereby the lid may be opened or closed with one hand without holding the same on the frying pan or the like with the other hand.

Another object of my invention is to provide a lid for frying pans and the like consisting of a main lid portion and an auxiliary lid attached thereto, which is capable of movement relative to the main lid portion and to effect an opening to allow the escape of vapors, but to trap any spattering or splashing grease and prevent the same from splashing onto a gas range or the kitchen walls.

Another object of my invention is to provide a lid or cover for frying pans and the like which consists of two separate lid portions, one of which is smaller than the other and which is adapted to be moved relative thereto, which lid can be used as a conventional closed one, or open, by a simple manual manipulation of one hand.

Another object of my invention is to provide a cover or lid for frying pans or the like which consists of two covers, one of which carries a knob at its upper surface and which knob is adapted to be grasped by one hand of the user so as to effect closing or opening of one of the covers with respect to the other.

With these and other objects in view, the invention consists in the construction and novel combination and arrangement of parts hereinafter fully described, illustrated in the accompanying drawings and pointed out in the claims hereto appended, it being understood that various changes in the form, proportion, and minor details of construction within the scope of the claims may be resorted to without departing from the spirit or sacrificing any advantages of the invention.

The invention will be more readily understood by referring to the drawings wherein:

Fig. 1 is a perspective view of the cover or lid embodying my invention;

Fig. 2 is a vertical cross sectional view of the lid shown in Fig. 1, wherein the main and auxiliary lids are in closed position;

Fig. 3 is a vertical cross sectional view of the lid shown in Fig. 1, and showing one of the lids raised with respect to the other, or showing the lid in its open position;

Fig. 4 is a front elevational view disclosing the post or shaft upon which the smaller of the two lids is mounted for movement;

Fig. 5 is a fragmentary sectional view disclosing a slight modification of the formation of the lid or cover showing a portion thereof resting on the top edge of a conventional frying pan, or the like; and Fig. 6 is a further modification of the formation of the lid disclosing a portion thereof made of glass, such as "Pyrex" and showing a portion of the lid resting upon a "Pyrex" frying or cooking utensil.

The cover or lid denoted generally at C is of circular outline and contour, and consists of what might be called a main cover or lid portion 7, and an auxiliary or smaller lid portion 8, the latter of which is movable with respect to the former. The lid portion 7 includes a downwardly-extending circular flange 9 which is adapted to enter and conform with the interior sidewall of the frying pan or the like, and a shoulder 10 which rests upon the top edge of the frying pan. This main lid portion 7 is provided with a central opening 11, and intermediate the opening and the shoulder 10 a circular groove 12 is formed, which groove is adapted to receive therein the grease spattering from the interior of the pan, and which grease is deflected into said groove by means of the smaller lid or cover 8.

A relatively rigid strap 13, which is preferably of slightly curved formation bridges the opening 11 centrally thereof and at diametrically opposed points this strap is attached at its ends to the underside of the main cover 7 by means of rivets 14 or other similar securing means. The supporting strap 13 is relatively rigid and has secured thereto centrally thereof an upstanding shaft or post 15. This shaft 15 has its lower end 16 reduced, thereby forming a shoulder 17 thereat. The reduced end 16 passes through an opening 18 in the support 13 and the shoulder 17 engages the upper face of the support. A securing means in the form of a washer or nut 19 is placed on the reduced end 16 of the shaft 15 and this reduced end 16 is then swedged over and thereby forms a secure fastening of the post 15 in the supporting bracket 13. As is clearly seen in Fig. 4, the nut or washer 19 engages the inner wall of the support 13 adjacent the opening therein, and the shoulder 17 on the shaft 15 engages the outer wall adjacent the opening in the support. The shaft 15 substantially midway between its end is provided with a recess 20. A coil spring 21 is placed within this recess 20, and then a suitable ball 22 is also placed within the recess 20 and the exterior wall about the opening of the recess 20 is swedged inwardly slightly as at 23 so as to maintain the ball and spring within the recess. The spring 21 continuously exerts an outward pressure on the ball 22 and substantially one-third of the surface of the ball thereby projects beyond the periphery of the shaft 15, see Fig. 4.

This shaft 15 may be made of metal or other suitable material and I have particularly in mind that the same may be made of a plastic or other material possessing non-heat conducting qualities so that when the thumb of the user engages the top 15' thereof, as later explained, the shaft will not be in a heated condition.

The smaller of the two lids 8, which has hereinbefore been referred to as an auxiliary lid is of general concavo-convex design, and the outer edge 8a thereof is preferably rolled or rounded similar to the rolled or rounded edge formation 7a at the opening in the main lid 7. The smaller lid 8 is provided centrally with an opening 24. The smaller lid 8 carries therewith centrally thereof a knob or hand-operating piece 25 which is preferably formed of suitable non-heat conducting material, and it may be plastic or other material, such as wood. This knob 25 is provided with a central opening 26 which extends from one end thereof to the other. A suitable bushing 27, preferably of metal is fixedly positioned within the opening 26 in the knob and is open at both ends. This bushing 27 can be secured within the knob 25 in any desired manner, but is preferably held therein by tight friction fit. The bushing 27 is provided intermediate its ends with spaced annular grooves 28 and 29 and the lower end thereof extends through the opening 24 in the lid 8 and is spun or otherwise turned over as at 30 and thereby firmly grips the interior of the lid 8 adjacent the opening 24 therein. This association of the knob 25 with the lid 8 by means of the bushing 26 results in a permanent union of the knob with the lid 8.

The dimensions of the opening in the hollow sleeve or bushing 27 is such that it forms a snug close fit with the shaft 15 upon which the lid 8 is mounted. By referring to Figs. 2, 3, and 4, it will be seen that when the smaller lid 8 is associated with the larger lid 7, the bushing 27 and knob 25 are concentrically disposed with respect to the shaft 15. In other words, the lid 8 is mounted on the shaft 15 by means of the bushing and knob and is capable of movement thereon. When the lid 8 is mounted on the shaft 15, regardless of the position of the lid 8, whether it be fully opened, partially open, or closed, the spring pressed ball 22 will exert sufficient pressure and friction within the bushing 27 so as to maintain the lid 8 in any desired elevated position between the two annular grooves 28 and 29.

When the lid 8 is in the position shown in Fig. 2, it is completely sealed and closed and the rounded bead 8a thereof is slightly above the grease-collecting groove 12. The rounded bead 7a at the opening in the lid 7 engages the underside of the smaller cover 8 inwardly of its peripheral edge. This provides for the formed steam and condensate of grease etc. to drop back into the pan as the two covers 7 and 8a thus sealed. In this closed position, the ball 22 is seated in the annular groove 28, having snapped thereinto when the lid 8 is pressed downwardly on the shaft 15. In Fig. 3, the lid has been raised to its highest point of elevation and in this position the ball 23 is in the annular groove 29, having snapped thereinto when the lid has been raised to register the groove with the ball.

It is to be understood that the structural characteristics as regards mounting of the large and small lid are present in connection with the modified form of the invention in Fig. 5. In Fig. 5, the formation of the main lid 7 is of a different contour than that shown in Figs. 1–3. In this structure, the main lid 7' is of general concavo-convex contour, and is provided with a central opening 11', which is closed by a smaller lid 8'. The main difference here is in the shape of the two covers and the disposition of the grease-collecting trough or groove 12' adjacent the outer circular edge of the cover. As shown in Fig. 5, the cover is mounted on the upper edge wall of a conventional frying pan or other cooking vessel F.

In Fig. 6, I have shown the main lid 7" as being made of glass, such as "Pyrex," and this lid embodies the central opening 11" therein, above which there is a raised circular rib 31, which rib, with a similarly-formed circular rib 32 spaced therefrom, and both ribs being integral with the lid 7' constitutes a grease-collecting trough or groove 12". In Fig. 6 I have shown the lid or cover mounted on the upper edge wall F of a "Pyrex" or other plastic frying pan or similar cooking utensil. It is to be understood that support 13 for the shaft 15, as shown in Figs. 2–4 is to be embodied with the lid or cover, as shown in Fig. 6. In Fig. 6, the movable or smaller cover, which may be of metal, is denoted at 8".

From the foregoing, I believe it is quite clear that I have provided a cover or lid for frying pans and the like which consists of two lids or covers, one of which is movable with respect to the other, and it can be so moved by one hand of the user. My lid may be used as a conventional closed lid and may be opened and closed as desired, when the occasion demands in the frying or cooking operation. It is to be distinctly understood that this lid can be used with a conventional frying pan or the like, or it can be used in combination with a "Pyrex" or similar plastic frying pan. Then too, the lid may be constructed wholly of metal or partially of metal, or any other suitable material, and in some instances the smaller of the two covers may be metal and the larger cover of "Pyrex" or similar material, or both lids may be made of "Pyrex" or similar material. If the lid is to be used as a conventional lid or cover for frying pans or the like, then the two lids or covers will be closed as in Fig. 2. Further, we will assume that the lid has been placed on a conventional or other frying pan and it is desired to uncover the opening in the larger of the lids or covers. This is accomplished by simply placing the index and middle fingers about the knob 25, at either side thereof, and then by urging the knob upwardly and with the thumb on the extreme upper end 15' of the shaft 15, the smaller of the two lids will be elevated to a point such as shown in Fig. 3 or to any point of elevation in-between the two grooves 28 and 29, as may be desired. It is quite clear, therefore, that the smaller of the two lids or covers can either be opened or closed without removing the lid as a whole from the frying pan or other cooking utensil. If the lid is being used with the smaller of the two covers open as in Fig. 3 and it is desired to close the same as shown in Fig. 2, then it is simply necessary to push down on the top of the knob 25, and this will cause the smaller lid to move downwardly and the spring pressed ball 22 will then engage the lower annular groove 29 and fix the two lids in their closed relationship as shown in Fig. 2.

One important feature of my invention is that the larger and the smaller lids or covers may be readily disassociated with each other by simply holding the larger one and pulling the smaller one upwardly on the shaft and entirely remove it from the shaft. This is desirable because it permits the two lids to be washed thoroughly and to be kept in a clean and sanitary condition. Of course, replacing the removed smaller lid is accomplished very simply by again mounting it on the shaft and pushing the same downwardly thereon.

Having described my invention, what I claim is:

1. A cover for frying pans or the like having a central opening therein, a support bridging said opening, a shaft on said support extending upwardly thereabove, a cover for said opening, said cover having a knob thereon centrally thereof, the knob having a central longitudinal opening through the same forming a bearing fitting on the shaft, said knob being slidable linearly on the shaft to lift said cover to uncover said opening by direct linear movement of the same on the shaft, the knob projecting above the cover and having an enlarged laterally projecting upper part adapted to be engaged at the under side thereof by the fingers to lift the same, and means enclosed by said knob providing for frictional engagement between the shaft and the knob to hold said last mentioned cover in closed position, said shaft projecting a short distance above the knob when the cover is in closed position so that the upper end of the shaft can be engaged by the thumb while placing other fingers of the same hand at the under side of the knob, whereby by placing one's thumb on the upper end of said shaft for downward pressure thereon, and simultaneously placing other fingers at the under side of said laterally projecting part of the knob and pulling upwardly thereon, the smaller cover can be lifted from over the opening in the first mentioned cover and the first mentioned cover held on the pan by the use of only one hand.

2. A cover for frying pans or the like having an opening therein, a shaft on said cover extending upwardly above the same, an auxiliary cover for said opening, said auxiliary cover having a knob secured thereon, the knob having a central longitudinal opening through the same to slidably fit on said shaft, the knob being slidable linearly on the shaft to lift the auxiliary cover to uncover said opening, and said knob extending above the auxiliary cover and having a part adapted to be engaged by the fingers to pull the knob and auxiliary cover upwardly, the upper end of the shaft projecting a short distance above the top face of that portion of the knob immediately surrounding the shaft for engagement by one finger for downward pressure thereon when the auxiliary cover is in closed position while pulling upwardly on the knob by the first mentioned fingers to lift the auxiliary cover, all of the said fingers being on one hand, and means providing for frictional engagement between the shaft and knob to hold the auxiliary cover in closed position and in open position or in any intermediate position.

HARRY P. SERIO.

REFERENCES CITED

The following references are of record in the file of this patent:

UNITED STATES PATENTS

| Number | Name | Date |
|---|---|---|
| 2,219,498 | Steyaert | Oct. 29, 1940 |
| 1,149,289 | Post et al. | Aug. 10, 1915 |
| 496,820 | Davies | May 2, 1893 |
| 1,712,473 | McWethy | May 7, 1929 |
| 1,867,994 | Wisenor et al. | July 19, 1932 |
| 616,883 | Bowers | Jan. 3, 1899 |
| 1,862,778 | Vought | June 14, 1932 |
| 1,002,004 | Skiba | Aug. 29, 1911 |

FOREIGN PATENTS

| Number | Country | Date |
|---|---|---|
| 764,780 | France | Mar. 12, 1934 |